US012253183B2

(12) United States Patent
Jarchau

(10) Patent No.: US 12,253,183 B2
(45) Date of Patent: Mar. 18, 2025

(54) VALVE

(71) Applicant: GEA MECHANICAL EQUIPMENT ITALIA S.p.A., Parma (IT)

(72) Inventor: Michael Jarchau, Lubeck (DE)

(73) Assignee: GEA MECHANICAL EQUIPMENT ITALIA S.p.A., Parma (IT)

( * ) Notice: Subject to any disclaimer, the term of this patent is extended or adjusted under 35 U.S.C. 154(b) by 0 days.

(21) Appl. No.: 18/256,586

(22) PCT Filed: Jul. 28, 2022

(86) PCT No.: PCT/IB2022/056990
§ 371 (c)(1),
(2) Date: Jun. 8, 2023

(87) PCT Pub. No.: WO2023/021349
PCT Pub. Date: Feb. 23, 2023

(65) Prior Publication Data
US 2024/0035577 A1    Feb. 1, 2024

(30) Foreign Application Priority Data

Aug. 20, 2021   (DE) .......................... 102021004243.3

(51) Int. Cl.
*F16K 3/26* (2006.01)
*B01F 25/441* (2022.01)
(Continued)

(52) U.S. Cl.
CPC .......... *F16K 3/267* (2013.01); *B01F 25/4413* (2022.01); *B01F 25/4423* (2022.01); *B01F 35/71805* (2022.01); *F16K 3/32* (2013.01)

(58) Field of Classification Search
CPC .......... F16K 3/262; F16K 3/265; F16K 3/267; F16K 3/32; F16K 1/123; F16K 1/385;
(Continued)

(56) References Cited

U.S. PATENT DOCUMENTS 1,483,742 A * 2/1924 John ........................ A23D 9/02
241/85
3,910,346 A * 10/1975 ter Braak .............. B01F 27/272
366/147
(Continued)

FOREIGN PATENT DOCUMENTS

CN          209524091 U     10/2019
EP            0034675 A1     9/1981
(Continued)

OTHER PUBLICATIONS

International Search Report and Written Opinion, as issued in connection with International Patent Application No. PCT/IB2022/056990, dated Nov. 2, 2022.
(Continued)

*Primary Examiner* — William M McCalister
(74) *Attorney, Agent, or Firm* — Maschoff Brennan

(57) ABSTRACT

A valve including a valve body having a fluid inlet and a fluid outlet, the valve body comprising a first valve element and a second valve element arranged in a housing. A gap is formed between the valve elements, the first valve element being conformed as a sleeve with an inner surface that tapers at least in sections towards the fluid outlet, the second valve element being conformed as a cone mounted in the sleeve, with the same inclination as the inner surface of the sleeve so as to form the gap. Additionally, an annular space open to the fluid outlet is formed between the sleeve and the inner surface of the housing. The sleeve has through holes towards the annular space and the cone has through openings towards the fluid inlet, the sleeve and the cone being axially adjustable relative to one another.

12 Claims, 3 Drawing Sheets

(51) Int. Cl.
*B01F 25/442* (2022.01)
*B01F 35/71* (2022.01)
*F16K 3/32* (2006.01)

(58) Field of Classification Search
CPC .............. F16K 27/0254; B01F 25/4413; B01F 25/4423; B01F 35/71805
USPC ...................... 251/319, 333, 356; 138/42, 43
See application file for complete search history.

(56) References Cited

U.S. PATENT DOCUMENTS

| | | | |
|---|---|---|---|
| 4,679,592 A | 7/1987 | Lamb | |
| 5,366,288 A * | 11/1994 | Dahllof | B01F 25/4413 366/338 |
| 5,749,650 A | 5/1998 | Kinney et al. | |
| 5,823,673 A * | 10/1998 | Muntener | B01F 27/2721 366/314 |
| 11,059,004 B2 * | 7/2021 | Nater | B01F 27/171 |
| 2016/0223099 A1 | 8/2016 | Freitas et al. | |
| 2017/0009906 A1 | 1/2017 | Nitta | |
| 2017/0304787 A1 | 10/2017 | Hanada et al. | |
| 2018/0355981 A1 * | 12/2018 | Hartman | F16K 47/08 |

FOREIGN PATENT DOCUMENTS

| | | |
|---|---|---|
| JP | 2011514237 A | 5/2011 |
| JP | 201673899 A | 5/2016 |
| WO | 9216288 A1 | 10/1992 |
| WO | 0103818 A1 | 1/2001 |
| WO | 0103819 A1 | 1/2001 |
| WO | 2009096825 A1 | 8/2009 |
| WO | 2021224048 A1 | 11/2021 |

OTHER PUBLICATIONS

Office Action as issued in connection with Japanese Patent Application No. 2023526064, dated Jul. 29, 2024.

* cited by examiner

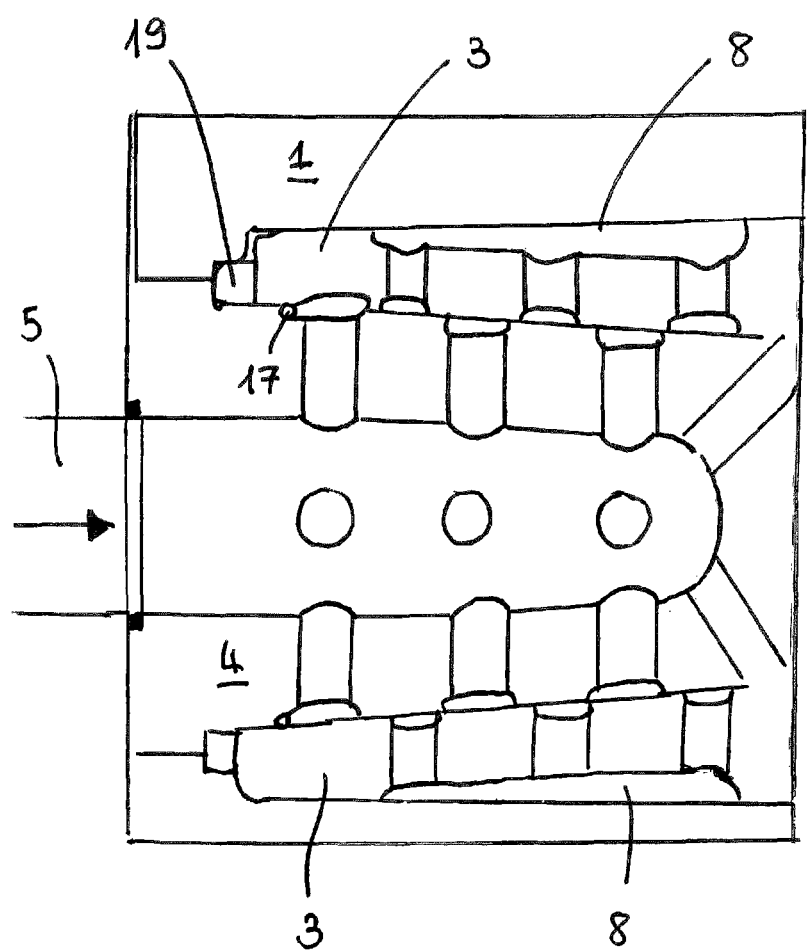

VALVE

TECHNICAL FIELD

The invention relates to valves.

BACKGROUND

Homogenizing valves may include narrow gaps through which emulsions and dispersions may be pressed. The gap height depends on the volume flow of the process fluids and should remain as small as possible in order to achieve the desired properties. For this reason, so-called multi-gap valves are used for larger volume flows, in which the total flow rate is divided in parallel on single gaps of small height, which are formed by several valve discs. This type of valve has been known for over 40 years, as disclosed for example in EP 0034675.

Such multi-gap valves are used, among other things, in the pharmaceutical and cosmetics industries, as well as in the food industry, for example in the processing of dairy products or fruit juices.

Valves suitable for this purpose are disclosed, inter alia, in U.S. Pat. No. 5,749,650 A, WO 01/03818 A1 and WO 01/03819 A1. In these constructions, a plurality of annular valve discs is stacked and configured in such a way that a gap is formed between two valve discs lying on top of one another.

During the functioning of the valve, the volume flow of the fluid flows from the fluid inlet centrally in the valve discs and flows radially through the gaps, so as to divide it into radially flowing single volume flows. These are then deflected and brought together again and expanded to a back pressure through a second valve. However, the known valves are afflicted with considerable disadvantages both in terms of their construction and in terms of their operation.

The valve discs must each be made of a hard, wear-resistant, rust-free material, which is associated with high costs for material procurement and processing.

In addition, these valves consist of a large number of single parts, the manufacture and assembly of which is only possible with a corresponding effort, and which naturally increase the susceptibility to failure.

High costs also result from the fact that spring elements are provided for centring the valve discs, for example in the valve known from U.S. Pat. No. 5,749,650 A. This requires a correspondingly large radial installation space, which leads to an overall size of the valve which is contrary to the requirements for a dimensionally optimised spatial shape.

Furthermore, the cleaning ability of the valve is limited by the installation space required for the springs, which is of great disadvantage for use for example in the food industry, since a so-called CIP cleaning (CIP=Cleaning In Place) is required without dismantling the components.

The respective gap with a given depth between the valve discs can only be introduced with a correspondingly great grinding effort in the manufacture of the valve discs.

In addition, the adaptation of the valves of conventional design creates problems when coordinating the gap height with the volume flow at a given homogenising pressure. The gap height is determined by a fixed distance, incorporated by grinding, between the contact surfaces and the valve surface crossed by the flow. The required sum of the gap areas crossed by the flow is predetermined at a given process pressure. If the number of discs is an integer, an adaptation is therefore necessary in most cases in order to achieve the exact pressure. This is done by deforming the upper discs by means of excess actuating force. This problem occurs particularly strongly when variable, in particular very different, volume flows occur during operation. As a result, the gap heights are no longer constant, but rather can be smaller or even completely closed in the upper area due to deflection.

Since the gap height has an influence on the product quality, it is no longer constant for each gap, which in total can negatively affect the homogeneous distribution, which is contrary to the purpose of the process and the quality requirement.

Regardless of this, the functional reliability of this valve is not guaranteed, because due to the large, pressurized surfaces of the valve discs, large actuating forces are required, which result in a large excess of force if process-related faults, for example due to air bubbles in the flow, its brief interruption, e.g., by switching processes occur. This excess force leads to high bending stress, especially on the upper valve discs towards the fluid inlet, which can lead to their breakage.

In the case of the valves according to the state of the art, the actuating forces are generated predominantly in a force-controlled manner, which is to say hydraulically, in order to apply the necessary high forces. The energy source required therefor is usually not part of the valve installation, so that a corresponding unit must be installed and operated, which is also associated with increased investment and operating costs.

Another issue of prior art solutions is linked to pressure peaks that may lead to process malfunction and cracking of high-pressure components.

Indeed, transient zero flow conditions may cause a complete temporary closure of the homogenizing gap. If affected pump cylinder changes from discharge to suction stroke again, the unaffected cylinders take over and full flow restarts again pumping against the closed homogenising valve.

This causes pressure peaks up to over two times the nominal pressure.

Document U.S. Pat. No. 4,679,592 A discloses a valve trim design for use in reducing valve cavitation. Valve and seat are axially movable and have frustoconical facing surfaces which form an annulus therebetween to control flow. The seat has an external frustoconical surface and a plurality of pairs of ports communicating with an internal bore. The ports are aligned so that flow from ports impinge upon each other within the interior chamber of the valve seat to reduce cavitation.

Other valves are described in documents WO 92/16288 A1 and U.S. Pat. No. 1,483,742 A.

SUMMARY

A valve including a housing and a valve body having a fluid inlet and a fluid outlet, the valve body comprising a first valve element and a second valve element arranged in a housing. A gap is formed between the valve elements, the first valve element being conformed as a sleeve with an inner surface that tapers at least in sections towards the fluid outlet, the second valve element being conformed as a cone mounted in the sleeve, with the same inclination as the inner surface of the sleeve so as to form the gap Additionally, an annular space open to the fluid outlet is formed between the sleeve and the inner surface of the housing. The sleeve has through holes towards the annular space and the cone has through openings towards the fluid inlet, the sleeve and the cone being axially adjustable relative to one another.

BRIEF DESCRIPTION OF DRAWINGS

One or more embodiments are described below with reference to the accompanying drawings, wherein:

FIG. 3 illustrates another embodiment of the valve of FIG. 1, with focus on the inlet side.

DETAILED DESCRIPTION

Figure 1:
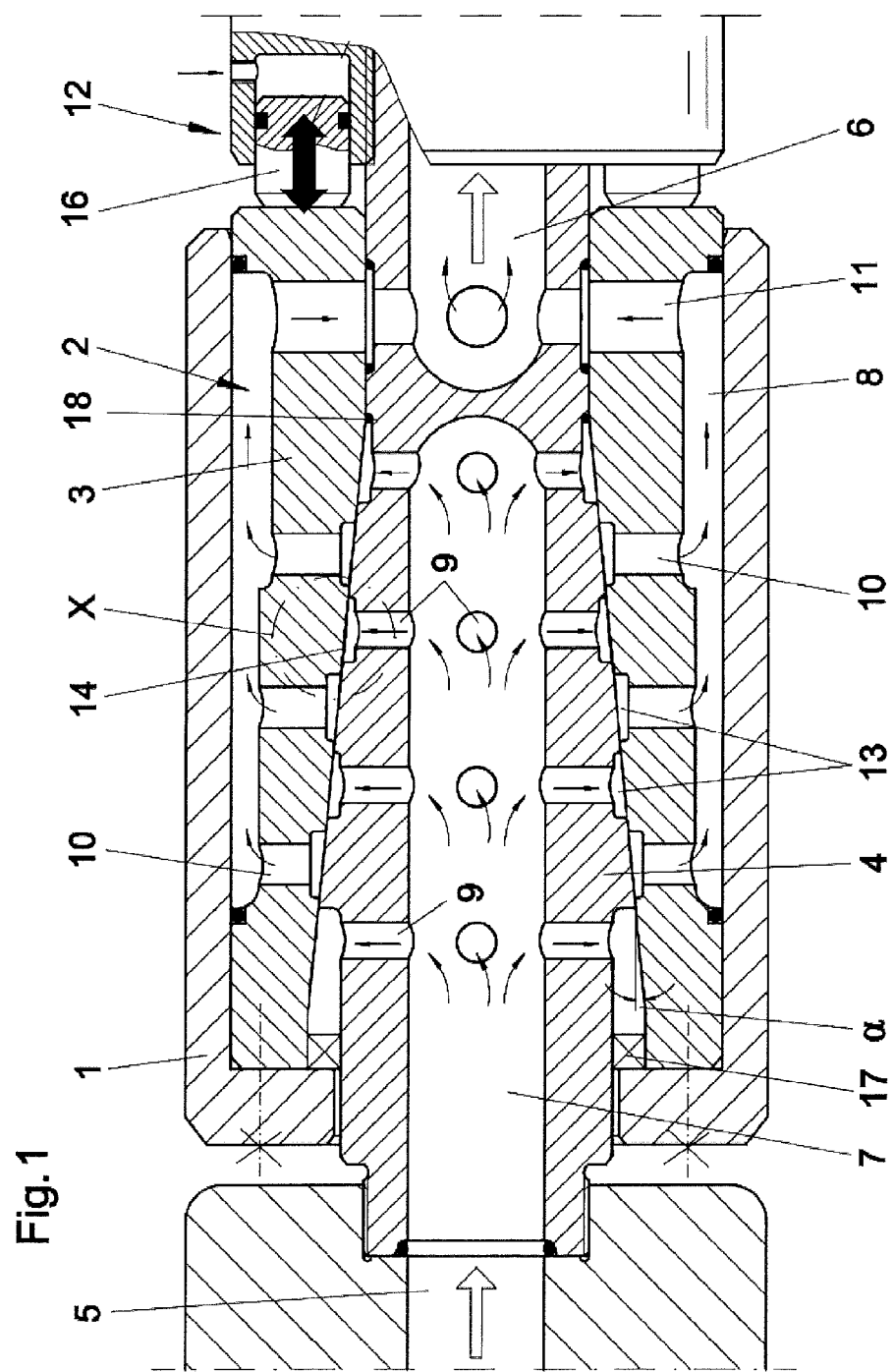
FIG. 1 shows a valve according to some embodiments in a sectional side view.

Valves are used, for example, in emulsification and mixing processes, in particular in the case of multiphase fluids with large flow rate amounts. In this case, emulsions and dispersions are brought to a process-dependent pressure in the range of typically about 50 to 500 bar via a high-pressure pump and pressed through narrow gaps in a valve known as a homogenizing valve.

When the expansion occurs, the desired crushing of the disperse phase is achieved due to turbulence and shear. The aim is to have a particle size as small as possible with a narrow particle size distribution and a use of energy as little as possible.

Some embodiments describe a valve that may be is structurally simpler and more cost-effective to manufacture, and its functional reliability may be improved.

Some embodiments describe a valve that may achieve a more precise setting of the gap.

Some embodiments describe a valve that may be less likely to process malfunctions and wear/cracking of high-pressure components, in particular due to zero gap situations.

Some embodiments describe a valve that may be easier to be cleaned, in particular suitable for undergoing CIP cycles.

The stated technical task and specified objects may be substantially achieved by a valve comprising:
  a housing;
  a valve body having a fluid inlet and a fluid outlet, the valve body comprising a first valve element and a second valve element arranged in said housing;
  a gap being formed between the valve elements, characterized by the following features:
  the first valve element is conformed as a sleeve with an inner surface that tapers at least in sections towards the fluid outlet,
  the second valve element is conformed as a cone mounted in the sleeve, with the same inclination as the inner surface of the sleeve so as to form the gap,
  an annular space open to the fluid outlet is formed between the sleeve and the inner surface of the housing,
  the sleeve has through holes towards the annular space and the cone has through openings towards the fluid inlet,
  the sleeve and the cone are axially adjustable relative to one another.

According to some embodiments, the through openings and the through holes are arranged offset in an axial direction of the valve body.

According to some embodiments, the through openings and the through holes are aligned radially.

In particular, the cone has a central, axially extending channel open to the fluid inlet.

According to some embodiments, the fluid outlet is provided concentrically and separately from the channel in the cone.

According to some embodiments, the valve further comprises a force-controlled or path-controlled adjusting element for the axial adjustment of the sleeve relative to the cone.

According to some embodiments, the annular space has transverse channels which open into the fluid outlet.

According to some embodiments, the through openings and/or the through holes on their mutually facing sides open into circumferential grooves that are wider in cross section.

According to some embodiments, the through openings and/or the through holes are each arranged at the same distance from one another.

In some embodiments, the fluid inlet and the fluid outlet run coaxially.

In some embodiments, the fluid inlet and the fluid outlet are angled to one another.

According to some embodiments, an angle of inclination of the inner surface of the sleeve is greater than the angle for self-locking.

According to some embodiments, the first valve element is a monolithic piece, and the second valve element is a monolithic piece.

According to some embodiments, the valve further comprises at least a first high-pressure gasket arranged between the first valve element and the second valve element.

In some embodiments, the valve further comprises a spacer ring arranged in a space obtained between a first end of the first valve element, the housing and the second valve element.

The new valve may be produced in a functional way with only a few components.

This may result in clear advantages over the prior art both in terms of manufacture and assembly as well as in terms of operation. These result, among other things, from the cost-reduced production and the lower susceptibility to failure, with a reduction in operating costs.

In some circumstances, a plurality of pairs of valve discs, an axial gap is present between respectively a pair of valve discs formed from a first and a second valve element. In some embodiments, a plurality of gaps is formed by only two valve elements, namely a sleeve as the first valve element and a cone mounted therein as the second valve element, each with a passage to an annular space that is provided between the sleeve and a housing open to the fluid outlet, which encloses the valve body.

It is crucial that the inner surface of the sleeve facing the cone tapers towards the fluid outlet and that the outer surface of the cone is conformed with the same inclination. The gap height, that is, the distance between the outer surface of the cone and the inner surface of the sleeve, is adjustable and synchronously the same for all gaps by an axial relative adjustment of the sleeve to the cone, which can be done through an adjusting element.

When the fluid is expanded, respectively two opposing jets meet each other after the gap exit in the adjacent circumferential groove, through which an additional homogenizing effect is created.

In some embodiments, the required actuating forces may also be significantly lower than in the case of the known valves, the adjusting element is being able to act with high precision in a force-controlled or path-controlled manner. The force-controlled drive can take place hydraulically or pneumatically, the path-controlled drive through fine threads, differential threads, piezo actuators, or the like. The path control offers a higher rigidity of the system, which is advantageous for applications that require short response times, for example for fast control tasks to compensate for pressure pulsation.

Based on the control signal, quantitative information about the current gap height of all gaps is available, which can be important for control and monitoring tasks, for documentation and for quality assurance.

Further advantages may result from a relatively small size and, during functioning, low hydraulic forces. This and the small number of components required enable operation with higher operating pressures. The compact and stiff design and the lack of spring elements also minimize the susceptibility to vibration, which in the prior art can manifest itself in high-frequency flow noises that arise when a spring-mass system is excited at a resonance frequency.

In addition to using the new valve as a homogenization valve, as described, the valve can also be used as a hydraulic valve, e.g. as a 2/2-way valve or as a pressure reducing valve in water and oil hydraulic systems, also in the same process, which leads to a high degree of standardization and an improved spare parts management in the plant engineering.

It is also conceivable to use an adjusting element acting in both directions to operate the valve, whereby operation is possible when the direction of flow is reversed, which is particularly advantageous in the case of CIP cleaning of the valve.

In the FIG. 1, a valve is shown in a sectional side view, which has a housing 1 in which a rotationally symmetrical valve body 2 is arranged. This valve body 2 consists of a first valve element conformed as a sleeve 3 and a second valve element mounted therein, designed as a cone 4, with a central, axially aligned channel 7 which is in fluid-open connection with a fluid inlet 5.

Advantageously, the sleeve 3 is a monolithic piece and the cone 4 is a monolithic piece.

In this context, the expression "monolithic" means that the piece is made of a single block, which cannot be dismantled.

The valve comprises a fluid inlet 5 and a fluid outlet 6.

The fluid outlet 6 is provided coaxially thereto and spatially separated, which in the example is incorporated in a cylindrical end region of the cone 4. Instead of the axial alignment of the fluid inlet 5 and/or of the fluid outlet 6, the alignment can also be angled, in particular right-angled, as a result of which flexible and inexpensive installation of the valve is possible.

In accordance with an aspect of some embodiments, the inner surface of the sleeve 3 is conformed tapered in the direction of the fluid outlet 6, while the outer surface of the cone 4 is inclined in accordance with the course of the inner surface of the sleeve 3. The angle of inclination α, with respect to the longitudinal axis of the cone 4, is selected so that it is greater than the angle for self-locking.

In particular, the sleeve 3 is placed on the cylindrical end area of the cone 4 with its inner surface which is likewise cylindrical in this area.

Starting from the channel 7, radially oriented through openings 9 are provided in the wall of the cone 4.

Each through opening 9 opens into a circumferential groove 13 on the side facing the inner surface of the sleeve 3.

In accordance with one embodiment, the circumferential grooves 13 are greater in width than the diameter of the through openings 9.

Through holes 10 comparable in terms of their conformation are incorporated in the wall of the sleeve 3.

In accordance with an aspect of some embodiments, the through holes 10 are offset in the axial direction of the valve body 2 with respect to the through openings 9 of the cone 4.

Each through hole 10 opens into a circumferential groove 13 on the side facing the cone 4.

In accordance with one embodiment, the circumferential grooves 13 are greater in width than the diameter of the through holes 10.

Preferably, both the through holes 10 and the through openings 9 are each arranged at the same distance in the axial and in the circumferential direction.

Opposite, that is, towards the inner side of the housing 1, the through holes 10 open into an annular space 8 formed between the inner side of the housing 1 and the sleeve 3.

In particular, the annular space 8 is in communication in a fluid-open manner with the fluid outlet 6 through transverse channels 11.

The radially aligned transverse channels 11 are arranged in the cylindrical end region of the sleeve 3 and the cone 4.

At the cylinder-shaped end of the cone 4 associated to the fluid outlet 6, a force-controlled adjusting element 12 with an axially reciprocating piston 16 is arranged. Thanks to the force-controlled adjusting element 12 and the axially reciprocating piston 16 an axial relative movement between the sleeve 3 and the cone 4 is possible so as to achieve an exact height of the circumferential gaps 14 through which the fluid can be pressed, the direction of flow of the fluid being indicated in FIG. 1 by arrows.

According to an aspect of some embodiments, the valve comprises a first high-pressure gasket 17 arranged between the sleeve 3 and the cone 4.

Preferably, the valve comprises also a second high-pressure gasket 18 arranged between the sleeve 3 and the cone 4.

High-pressure gaskets 17,18 seal the high-pressure side between the sleeve 3 and the cone 4 in the respective cylindrical section.

According to some embodiments, illustrated in FIG. 3, the valve comprises a spacer ring 19.

In particular, the spacer ring 19 is arranged in a space obtained between a first end of the sleeve 3, the housing 1 and an outer surface of the cone 4.

The spacer ring 19 abuts the housing 1, the first end of the sleeve 3 and the outer surface of the cone 4.

The spacer ring 19 provides an additional safety feature, preventing "zero gap" situations.

Figure 2:
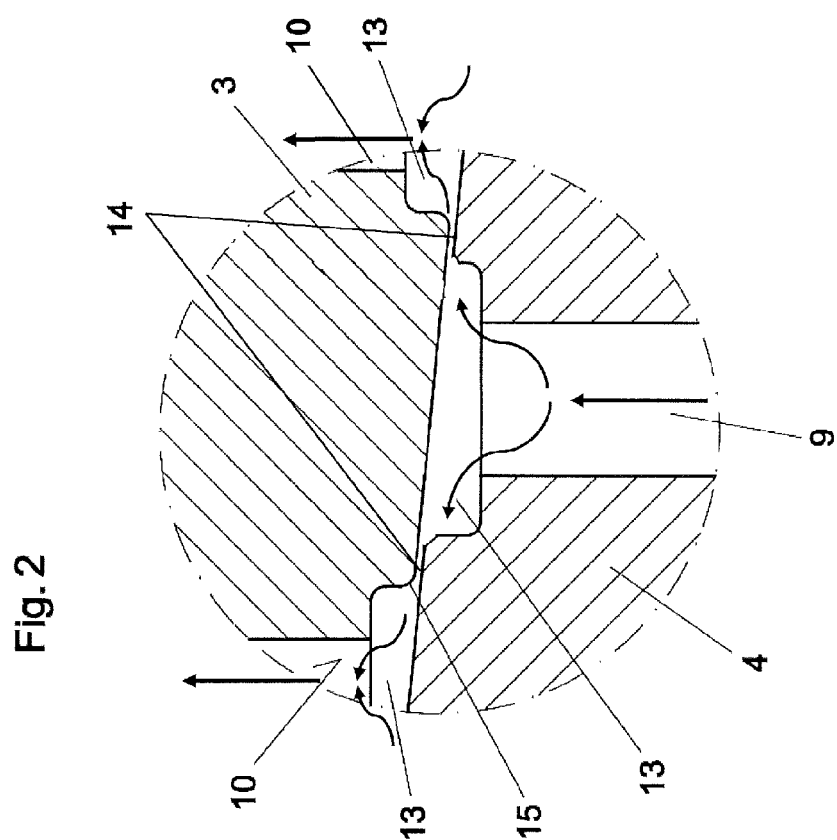
FIG. 2 shows an enlarged section of the valve according to the marking X in FIG. 1.

In FIG. 2, in an enlarged illustration, a detail of a region is shown in which the mutually facing inclined surfaces of the sleeve 3 and of the cone 4 form a circumferential gap 14. Their contours are conformed as knife edges 15. An impact effect of the exit jets running in opposite directions in the circumferential groove 13 can be seen from the arrow indications.

The fluid is fed under pressure through the fluid inlet 5 to the channel 7 of the cone 3, through the through openings 9 in the gaps 14 and further pressed through the through holes 10 in the annular space 8, from where the fluid is guided through the transverse channels 11 to the fluid outlet 6.

Two valves according to some embodiments may also be arranged in parallel.

A modular system of two or more valves is thus enviseagable.

The characteristics of a valve according to some embodiments, are clear, as are the advantages.

In particular, thanks to the use of two monolithic pieces—the sleeve and the cone—the valve achieves a more precise setting of the gap over the prior art, in particular with respect to multi-gap solutions with many components having individual manufacturing tolerances leading to an uneven hydraulic processing.

In addition, the spacer ring prevents "zero gap" situation and associated shock loadings.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., con-note a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present invention have been described in detail, it should be understood that the various changes, substitutions, and alterations could be made hereto without departing from the spirit and scope of the present invention.

The invention claimed is:

1. A valve comprising:
   a housing; and
   a valve body having a fluid inlet and a fluid outlet, wherein the fluid inlet and the fluid outlet are coaxial, the valve body comprising a first valve element and a second valve element arranged in said housing, wherein:
   the first valve element is conformed as a sleeve with an inner surface that tapers at least in sections toward the fluid outlet and the second valve element is conformed as a cone mounted to the inner surface of the sleeve with the same incline as the inner surface of the sleeve so as to form a gap between the first valve element and the second valve element, said cone having a central, axially extending channel open to the fluid inlet,
   an annular space open to the fluid outlet is formed between the sleeve and an inner surface of the housing,
   the sleeve has through holes towards the annular space and the cone has through openings towards the fluid inlet,
   the sleeve and the cone are axially adjustable relative to one another,
   the fluid outlet is provided concentrically and separately from the central, axially extending channel in the cone, and
   the fluid outlet is included in a cylindrical end region of the cone.

2. The valve according to claim 1, wherein the through openings and the through holes are arranged offset in an axial direction of the valve body.

3. The valve according to claim 1, wherein the through openings and the through holes are aligned radially.

4. The valve according to claim 1, further comprising one or more of a force-controlled adjusting element and a path-controlled adjusting element for the axial adjustment of the sleeve relative to the cone.

5. The valve according to claim 1, wherein the annular space is in fluid communication with the fluid outlet through a transverse channel.

6. The valve according to claim 1, wherein one or more of the through openings and the through holes open into circumferential grooves that are wider in cross section.

7. The valve according to claim 1, wherein one or more of the through openings and the through holes are each arranged at the same distance from one another.

8. The valve according to claim 1, wherein an angle of incline of the inner surface of the sleeve is greater than an angle for self-locking.

9. The valve according to claim 1, wherein the first valve element and the second valve element are each a single unitary piece.

10. The valve according to claim 1, further comprising at least a first high-pressure gasket arranged between the first valve element and the second valve element.

11. The valve according to claim 1, further comprising a spacer ring arranged in a space between a first end of the first valve element, the housing, and the second valve element.

12. The valve according to claim 1, wherein the valve is one or more of: a homogenisation valve, a hydraulic shut-off valve, a hydraulic pressure reducing valve, and a hydraulic throttle valve.

* * * * *